Oct. 18, 1955  O. C. OLSEN  2,720,991
VEHICULAR APPARATUS FOR TRANSPORTATION OF FREIGHT
Original Filed May 10, 1950  2 Sheets-Sheet 1
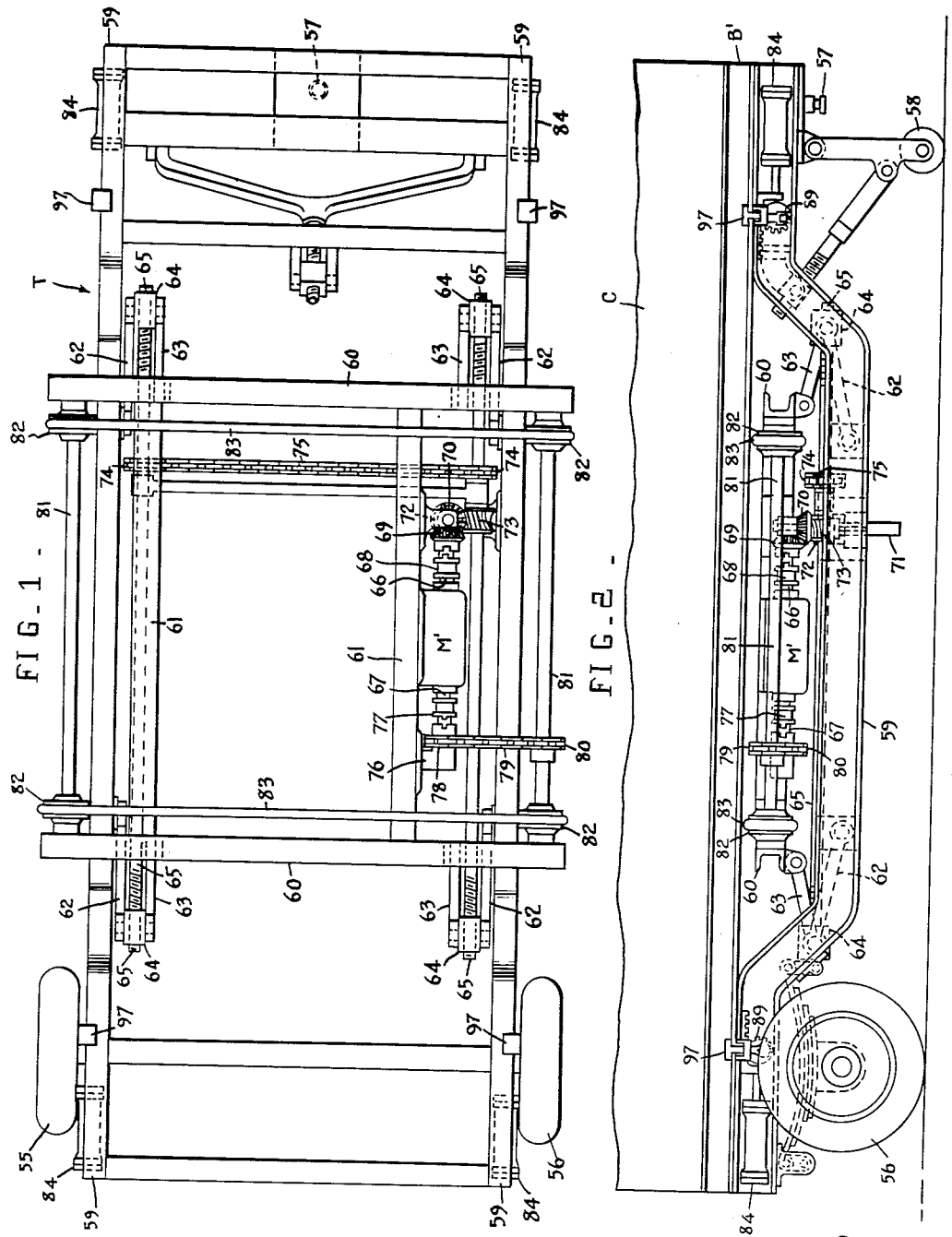
Inventor
Olaf Christopher Olsen
By Ogle R. Singleton
Attorney Oct. 18, 1955          O. C. OLSEN          2,720,991
VEHICULAR APPARATUS FOR TRANSPORTATION OF FREIGHT
Original Filed May 10, 1950          2 Sheets-Sheet 2
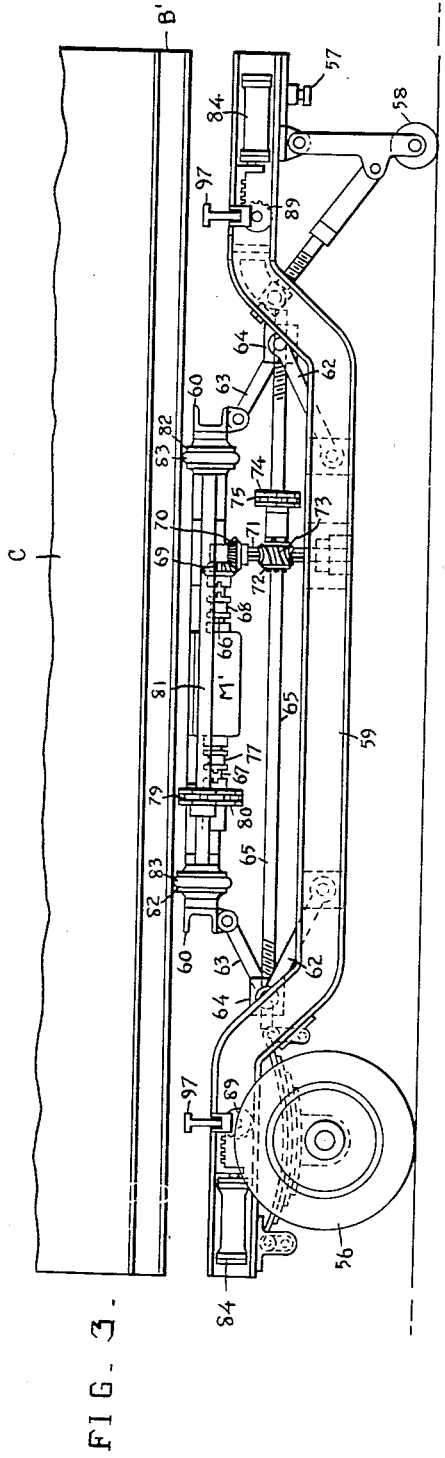
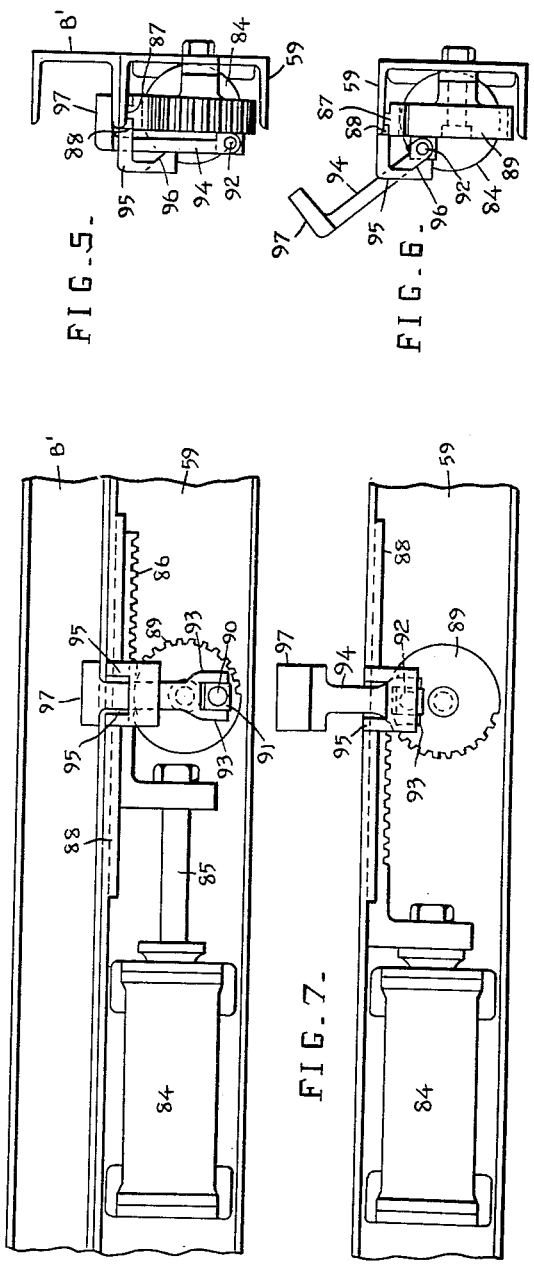

United States Patent Office 2,720,991
Patented Oct. 18, 1955

2,720,991

VEHICULAR APPARATUS FOR TRANSPORTATION OF FREIGHT

Olaf Christopher Olsen, Johnson County, Kans., assignor to Transport Equipment, Inc., a corporation of Maryland Original application May 10, 1950, Serial No. 161,210. Divided and this application August 20, 1951, Serial No. 242,693

2 Claims. (Cl. 214—520)

My invention consists in a new and useful improvement in apparatus for the transportation of freight, and is designed more particularly for transportation of freight of less than carload lots in containers which are handled entirely mechanically by conveyor mechanisms incorporated in land vehicles. This application is a divisional application of my co-pending parent application, Serial Number 161,210, filed May 10, 1950.

My improved land vehicle is provided with a vertically reciprocable platform having conveyor cables disposed transversely of the vehicle whereby the containers can be raised and moved off of the vehicle, and moved onto and lowered upon the vehicle, and also provided with a novel form of locking mechanism whereby the containers are firmly attached to the vehicle during transport thereby.

While I have illustrated in the drawings filed herewith and have hereinafter fully described one specific embodiment of my invention, it is to be distinctly understood that I do not consider my invention to be limited to said specific embodiment, but refer for its scope to the claims appended hereto.

In the drawings:

Fig. 1 is a top plan view of a truck chassis and its conveyor mechanism.

Fig. 2 is a side elevation of the chassis and conveyor mechanism, the latter being shown retracted.

Fig. 3 is a view similar to Fig. 2, the conveyor mechanism being shown extended.

Fig. 4 is a side elevation of the locking means for the chassis and container, the parts being shown in locked position.

Fig. 5 is an end view of the chassis locking mechanism, the parts being in the position illustrated in Fig. 4.

Fig. 6 is a view similar to Fig. 5, the parts being shown in unlocked position.

Fig. 7 is a view similar to Fig. 4, the parts being shown in unlocked position.

My improved vehicle has a chassis T with conveyor and locking mechanism thereon. The chassis T has the ordinary form of rear wheels 56 and forward coupling mechanism 57 with swinging supporting wheel 58. The side beams 59 are underslung providing an upper level at front and rear of the chassis and a lower level amidship. The conveyor platform is composed of two angle beams 60 transverse to the side beams 59 and two angle beams 61 parallel with the beams 59. This platform is mounted upon the beams 59 for vertical movement relative to the beams 59, by pivoted links 62 on the beams 59 and pivoted links 63 on the beams 60, both sets being pivoted to blocks 64 through which are threaded the ends of shafts 65. Suitably mounted on one of the beams 61 is a motor M' having driving shafts 66 and 67. The shaft 66 is connected by clutch 68 with miter gears 69, 70 driving slotted shaft 71 slidable in and driving worm gear 72 meshing with worm 73 on one of the shafts 65 connected by sprocket wheels 74 and sprocket chain 75 with the other shaft 65. The motor driving shaft 67 is journaled in a bracket 76 on the beams 61 and connected by clutch 77, sprocket wheel 78, sprocket chain 79 and sprocket wheel 80, with shaft 81 journaled in the ends of beams 60 on one side of the chassis T. A pulley 82 is mounted at each end of this shaft 81 and a second shaft 81 is journaled in the beam 60 on the other side of the chassis T, provided with two pulleys 82, and a conveyor cable 83 is rove about the pair of pulleys adjacent each of the beams 60.

I will now describe the locking means with which the chassis T is provided. Suitably mounted at each end of each of the beams 59 is a pressure cylinder 84 with pistons 85 attached to a rectilinear rack 86 provided with a key 87 in a keyway on the beams 59, and meshing with a segmental rack 89 rotatably mounted on the beam 59. The rack 89 is provided on its face with a stub shaft 90 on which is rotatably mounted a block 91 having trunnions 92 disposed in the forked ends 93 of a link 94 passed through a yoke 95 mounted on the keyway 88, and having an inclined seat 96. The link 94 has at its upper end the locking hook 97.

Having described the details of construction of the truck, I will now describe its use. We will assume that one of the containers C has been charged with the load of freight to be transported and has been imposed upon the chassis T (as illustrated in Fig. 2), the beams B' of of the container C registering with the beams 59 of the chassis T, and the locking hooks 97 fastening them thereon, and rigidly attaching the container C to the chassis T for transportation thereby. We will assume that the load transported by the truck reaches a terminal. The truck is laid alongside a platform. The locking hooks 97 are released by reciprocation of pistons 85 and their associated mechanisms, assuming the positions indicated in Fig. 3 and Fig. 6. Motor M', by clutch 68, then actuates the reciprocating mechanism of the conveyor platform of the chassis T, bringing conveyor cables 83 into contact with beams B' of the container C and thereby raising container C thereon until its beams B' are clear of hooks 97, as illustrated in Fig. 3. The motor M', by clutch 77, then actuates the cables 83 to cause the container C to move transversely of the chassis T toward the platform.

It is obvious that the reciprocating and conveyor mechanism of the truck chassis T can be applied to a railroad car. The reversal of the several steps of the heretofore described process serves to move the container from the platform to the chassis. It is obvious that the container C may be of any desired form and size to provide a supporting medium for the particular kind of freight to be transported.

Having described my invention, what I claim is:

1. In a vehicle, the combination of a chassis having a pair of horizontal, lateral beams, each of said beams having a pair of upper end portions and an intermediate lower portion, all of said end portions having their upper surfaces in a common plane, and the two intermediate portions having their upper surfaces in a common plane; a platform; supporting means for said platform, mounted on said intermediate portions of said beams, and adapted to raise and lower said platform relative to said chassis; a pair of horizontal conveyor cables carried by said platform and adapted to travel transversely of said chassis, the parts being so dimensioned and related that the upper surfaces of said cables are above and below the plane of said end portions when said platform is raised and lowered, respectively; a prime mover carried by said platform; and means, driven by said prime mover, adapted to alternatively actuate said raising and lowering means and drive said cables.

2. In a vehicle, the combination of a chassis having a pair of horizontal beams, each of said beams having a pair of elevated portions and a lower portion, all of said elevated portions having their upper surfaces in a common plane, and the two lower portions having their upper surfaces in a common plane; a platform; supporting means for said platform, mounted on said chassis, and adapted to raise and lower said platform relative to said chassis; conveyor means carried by said platform and adapted to travel transversely of said chassis, the parts being so dimensioned and related that the upper surface of said conveyor means is above and below the plane of said elevated portions when said platform is raised and lowered, respectively; a prime mover carried by said platform; and means, driven by said prime mover, adapted to alternatively actuate said supporting means and drive said conveyor means.

References Cited in the file of this patent

UNITED STATES PATENTS

| Number | Name | Date |
|---|---|---|
| 1,257,169 | Yarbrough | Feb. 19, 1918 |
| 1,382,328 | Stone | June 21, 1921 |
| 1,830,740 | Leech et al. | Nov. 3, 1931 |
| 2,058,891 | Kellett | Oct. 27, 1936 |
| 2,117,067 | Ludington | May 10, 1938 |
| 2,123,505 | Faries | July 12, 1938 |
| 2,132,612 | Faries | Oct. 11, 1938 |
| 2,172,244 | Grundler | Sept. 5, 1939 |
| 2,186,463 | Maine | Jan. 9, 1940 |
| 2,244,524 | Lima | June 3, 1941 |
| 2,266,791 | Norbom | Dec. 23, 1941 |
| 2,467,354 | Baldwin | Apr. 12, 1949 |
| 2,510,573 | Gray | June 6, 1950 |
| 2,547,269 | Kinsey | Apr. 3, 1951 |
| 2,621,811 | Lull | Dec. 16, 1952 |